Oct. 18, 1927.
H. BROOCK
1,645,789
AUTOMOBILE BUMPER
Filed Dec. 29, 1924
2 Sheets-Sheet 2
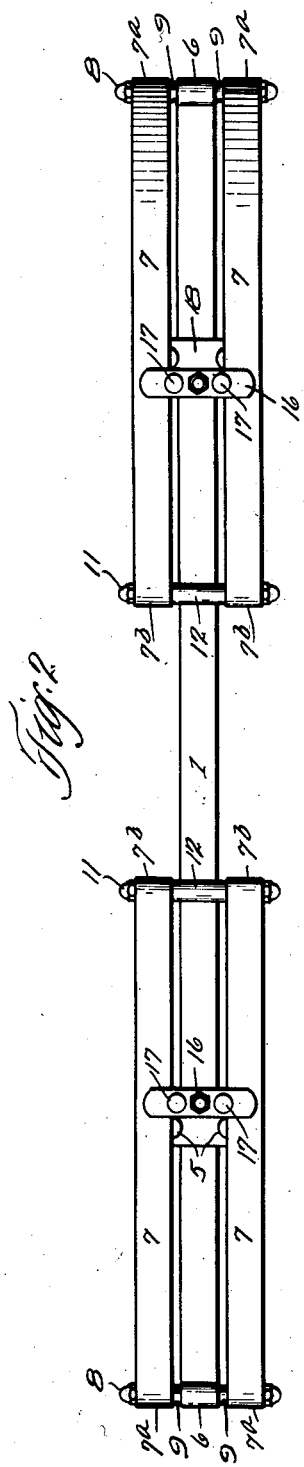
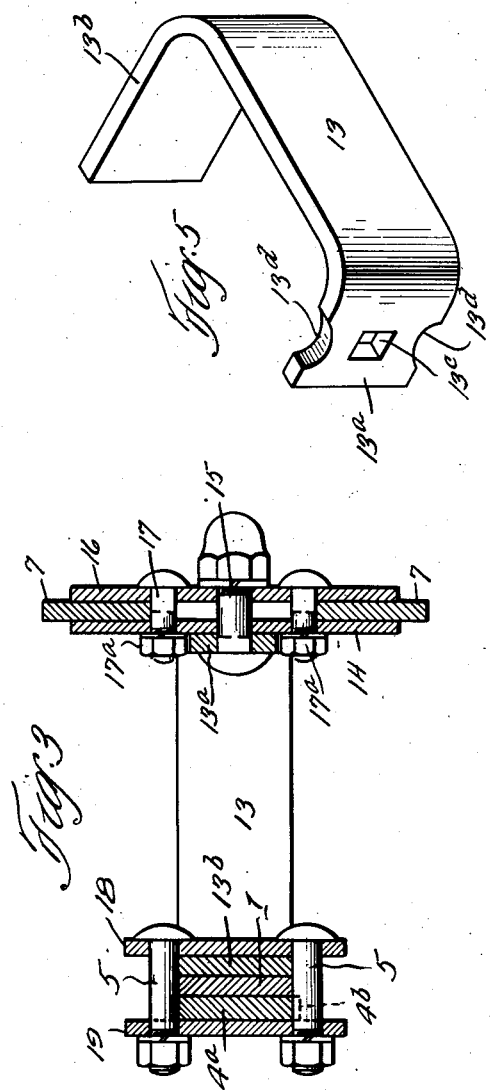
Inventor
Harold Broock,
By Hull, Burk West.
Attys.

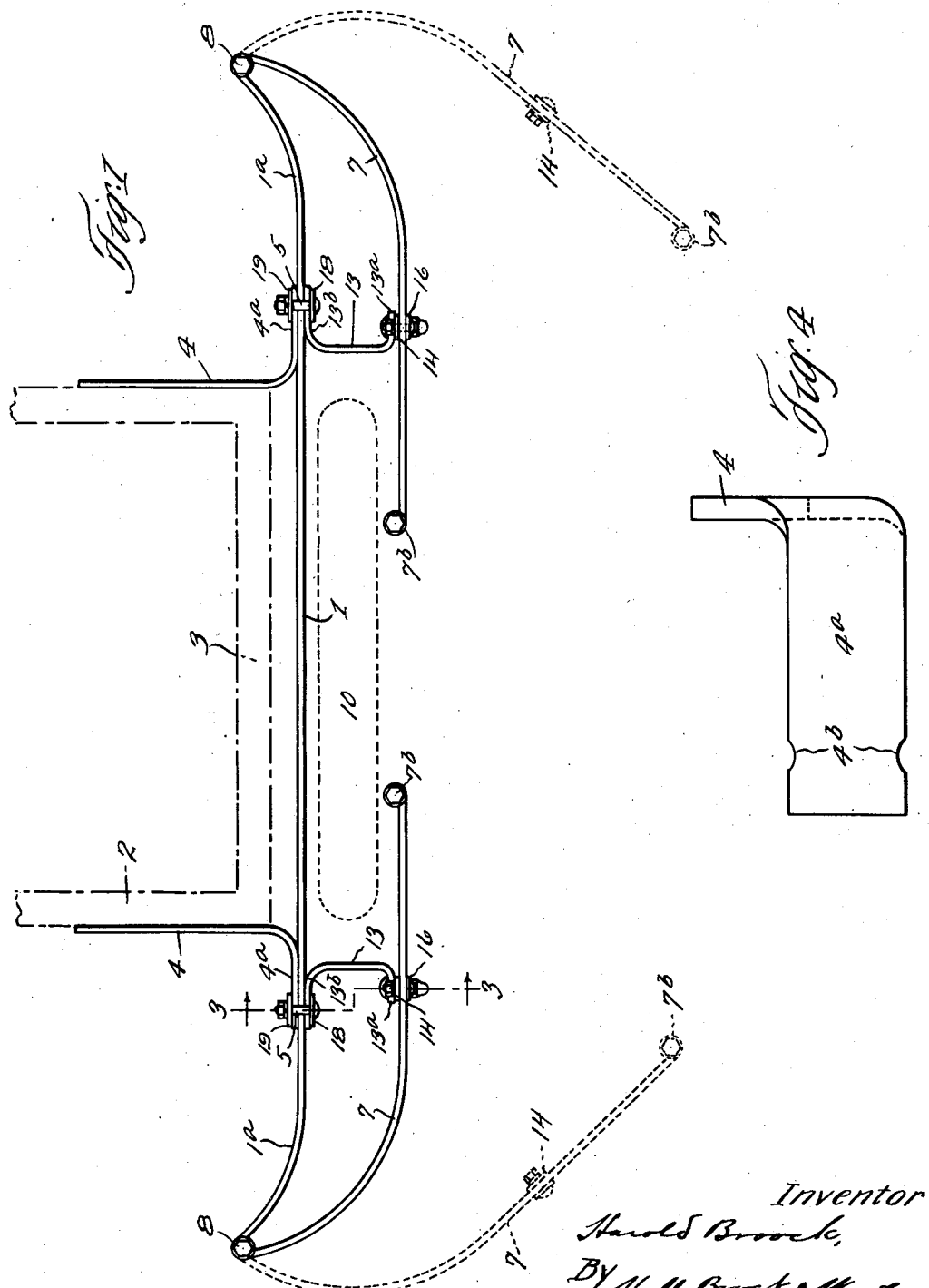

Patented Oct. 18, 1927.

1,645,789

UNITED STATES PATENT OFFICE.

HAROLD BROOCK, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed December 29, 1924. Serial No. 758,519.

This invention relates to automobile bumpers, and more particularly to bumpers of the fender-guard type which are applied to the rear of automobiles, there being a space or pocket provided between the rear fender-guard members of the bumper for the reception of a spare tire.

It is the general purpose and object of this invention to provide a bumper of the character referred to which shall not only serve to protect the tire from impact, but which may be conveniently operated for the purpose of affording access to the tire and the space provided therefor. Further and more limited objects of the invention will appear hereinafter and will be realized in and through the combinations of elements embodied in the claims.

Referring to the drawings, Fig. 1 represents a plan view of a bumper constructed in accordance with my invention and indicating the manner in which it may be applied to and supported from the rear end of an automobile frame; Fig. 2 an elevation of the bumper shown in the preceding view; Fig. 3 a detail in section corresponding to the line 3—3 of Fig. 1; Fig. 4 a detail in perspective of one of the bumper supporting-arms; and Fig. 5 a similar view of one of the braces interposed between the rear fender-guard members of the bumper and the front bars.

For convenience of description, the bumper will be assumed to be in the position which it occupies when applied to the rear of an automobile and the terms "front" and "rear" will be used in accordance with this assumption, but without any intention of necessarily limiting the application of the bumper to any particular part of the vehicle.

Describing the various parts by reference characters, 1 indicates a bar which extends across the rear end of an automobile and having end members 1ª which extend across the fenders, the rear end of the frame being indicated by dot-and-dash lines in Fig. 1 and including the side members 2 and the rear cross member 3. The bar 1 is provided with supporting arms 4 attached to the end members 1ª thereof and extending forwardly therefrom and adapted to be secured to the side members in any convenient manner. The rear ends of the arms 4 are bent outwardly at 4ª into engagement with the front face of the bar 1 and are secured thereto by bolts 5, which also serve to secure to such bar 1 the rear ends of the bracing bars, which will be described hereinafter.

The end members 1ª are provided each with an eye 6. 7 denotes upper and lower bars each having an eye 7ª at the outer end thereof, one pair of upper and lower bars being pivotally connected to each end of the bar 1 by means of bolts 8 extending through aligned eyes 6 and 7ª. Spacing washers 9 are shown as interposed between the eyes 6 and 7ª. The bars 7 extend rearwardly and inwardly from the outer ends of the bar 1 so that they serve to overhang and largely protect a spare tire 10 in the space between the inner ends of the fender guard bars 7 and the bar 1. The inner ends of the bars 7 are provided each with an eye 7ᵇ, and a bolt 11 extends through a spring sleeve 12 and the aligned eyes at the inner ends of each pair of bars, respectively.

With the parts constructed and arranged as described, the bars 7 may be swung about the bolts 8 as a pivot. In order to fasten them in proper relation to the bar 1 and to the spare tire 10, a brace bar 13 is interposed between each pair of arms 7 and the opposed end member 1ª and supporting arm 4. One of these brace bars is shown in detail in Fig. 5 and comprises a short end flange 13ª adapted to bear against a clamping plate 14 on the front sides of the bars 7, the opposite end flange 13ᵇ being elongated to provide an extended bearing against the rear face of the opposed member 1ª. The flange 13ª is provided with a square hole 13ᶜ for the reception of the square shank of a stove bolt which extends through such aperture and apertures in the front and rear clamping plates 14 and 16, which plates are further clamped against the bars 7 by means of stove bolts 17. The flange 13ª is provided with recesses 13ᵈ at the top and bottom thereof for the accommodation of the nuts 17ª on the last mentioned bolts.

Each flange 13ᵇ bears against a member 1ª and is secured to such member by means of the bolts 5 and the clamping plates 18 and 19 applied respectively to the rear face of the flange 13ᵇ and to the front face of the arm extension 4ª, the arm extension being provided with recesses 4ᵇ at the top and bottom thereof for the reception of the said bolts.

The parts 1ª and the parts of the bars 7 which extend across the fenders constitute fender guards; and the parts of the bars 7 which project inwardly beyond the bracing bars 13 constitute additional protecting and retaining means for the square tire or tires which may be contained within the space in front of such extended portions of the bars 7 and between the brace bars 13.

When it is desired to obtain access to a spare tire or to the space provided therefor, it is necessary only to remove the nuts from the bolts 15 and 17 on one or both pairs of bars 7. The bars 7 may then be swung about the bolts 8 as a pivot, as indicated by dotted lines in Fig. 1. The bars may thereafter be swung back against the flanges 13ª and secured thereto by the plates 14 and 16 and the bolts 15 and 17.

Having thus described my invention, what I claim is:—

1. The combination, with a vehicle frame, of members supported from such frame and each extending outwardly therefrom, a plurality of bars each pivotally connected at its outer end to the outer end of one of the said members and extending rearwardly and inwardly therefrom, means spacing the inner portions of said bars from their respective supporting members, means securing the inner end portions of said bars in vertically spaced relation, and means detachably securing the said bars in horizontally spaced relation to the spacing means.

2. The combination, with a vehicle frame, of members supported from such frame and each extending outwardly therefrom, one or more bars each pivotally connected at its outer end to the outer end of one of the said members and extending rearwardly and inwardly therefrom, and means detachably supporting the said bars in horizontally spaced relation from the said members, the inner ends of the bars providing a space in front thereof for the reception of a spare tire.

3. The combination, with a vehicle frame, of members supported from such frame and each extending outwardly therefrom, of a plurality of bars each pivotally connected at its outer end to the outer end of one of said members and extending rearwardly and inwardly therefrom, said bars being held in spaced relation at their inner end portions, a brace bar connected to each of the said members and extending rearwardly therefrom, and means detachably connecting the first mentioned bars with said brace bars.

4. The combination, with a vehicle frame, of members supported from such frame and each extending outwardly therefrom, one or more bars each pivotally connected at its outer end to the outer end of one of the said members and extending rearwardly and inwardly therefrom, a brace bar connected to each of the said members and extending rearwardly therefrom, and means detachably connecting the first mentioned bars with said brace bars, the first mentioned bars extending inwardly beyond their respective brace bars and forming with such bars a space for the reception of a spare tire.

5. The combination, with a vehicle frame, of members supported from such frame and each extending outwardly therefrom, each of said members having an eye at the outer end thereof, an upper and a lower bar for each of said members and each having an eye at the outer end thereof, bolts extending through the aligned eyes of the said members and the eyes of the upper and lower bars cooperating therewith, the said bars extending rearwardly and inwardly from their points of connection with their respective members, a spacing member interposed between each of the first mentioned members and the inner portions of the bars connected respectively thereto, and means for detachably connecting the said bars to the said spacing members, said connecting means being adapted to hold the said bars in spaced relation to each other when disconnected from the said spacing members.

6. The combination, with a vehicle frame, of members supported from such frame and each extending outwardly therefrom, each of said members having an eye at the outer end thereof, an upper and a lower bar each having an eye at the outer end thereof, bolts extending through the aligned eyes of the said members and the eyes of the upper and lower bars cooperating therewith, the said bars extending rearwardly and inwardly from their points of connection with their respective members and means for detachably supporting the said bars in horizontally spaced relation with respect to the said members at points remote from the outer ends of such members, the inner ends of each pair of upper and lower bars being connected and such ends extending inwardly beyond the points at which such bars are connected to such spacing and supporting means.

7. The combination, with a vehicle frame, of a bumper comprising a bar extending across the rear of the frame and having end members arranged to protect the fenders of such vehicle, one or more bars each pivotally connected at its outer end to the outer end of one of the said members and extending rearwardly and inwardly therefrom, spacing members interposed between each of the end members and the inner portions of the bar or bars connected respectively thereto, and means for detachably connecting the said bars to said spacing members with the inner ends of said bars projecting inwardly beyond their respective spacing members.

8. The combination, with a vehicle frame, of a bumper comprising a bar extending across the rear of the frame and having end members arranged to protect the fenders of such vehicle, one or more bars each pivotally connected at its outer end to the outer end of one of the said members and extending rearwardly and inwardly therefrom, and means detachably supporting the said bars in horizontally spaced relation from the said members, the inner ends of the bars providing a space in front thereof for the reception of a spare tire.

9. The combination, with a vehicle frame, of a bumper comprising a bar extending across the rear of the frame and having end members arranged to protect the fenders of such vehicle, one or more bars each pivotally connected at its outer end to the outer end of one of the said members and extending rearwardly and inwardly therefrom, a brace bar connected to each of the said members and extending rearwardly therefrom, and means detachably connecting the first mentioned bars with said brace bars, the first mentioned bars extending inwardly beyond their respective brace bars and forming with such bars a space for the reception of a spare tire.

10. A vehicle bumper including a member extending outwardly to protect the fenders of a vehicle, a plurality of bars pivotally connected at their outer ends to the outer ends of the said member and extending rearwardly and inwardly therefrom and providing a space in front thereof for the reception of a spare tire, means horizontally spacing the said bars from the said member, and means detachably connecting the said bars to the said member, said connecting means being adapted to hold the bars in proper spaced relation when detached from the said horizontally spacing means.

In testimony whereof, I hereunto affix my signature.

HAROLD BROOCK.